United States Patent Office 3,426,114
Patented Feb. 4, 1969

3,426,114
METHOD OF TREATING MONOLITHIC CERAMIC CAPACITORS
Ronald J. Brandmayr, Neptune, and Sam Di Vita, West Long Branch, N.J., assignors to the United States of America as represented by the Secretary of the Army
No Drawing. Filed Feb. 4, 1965, Ser. No. 430,503
U.S. Cl. 264—102                             1 Claim
Int. Cl. H01g 13/00

ABSTRACT OF THE DISCLOSURE

Void free monolithic ceramic capacitors of high density and improved electrical reliability are obtained by first heat treating the capacitor at a temperature between 500° F. and 2000° F. for about 2 hours. The capacitor is then embedded in a suitable parting agent inside a platinum lined, stainless steel container. The container is evacuated, then sealed, and then subjected to an isostatic inert gas pressure of 10,000 pounds per square inch at 2000° F. for about one-half hour.

---

The invention described herein may be manufactured and used by or for the Government for governmental purposes without the payment of any royalty thereon.

This invention relates in general to the art of treating monolithic ceramic capacitors and in particular to a method of eliminating voids in monolithic ceramic capacitors.

Monolithic ceramic capacitors are layered, miniaturized capacitors. They have been made in multiples on platens using an inorganic material such as barium titanate, as the dielectric. According to one process of manufacture, the platens are moved through the various operations by means of a conveyor chain making as many trips around the machine as necessary depending upon the number and thickness of the dielectric required. The platens proceed through a drying terminal to the opposite end of the machine where electrodes of palladium are applied by the silk screen method. The platen moves through another drying tunnel which dries the applied electrode and returns it to the spray booth to receive the next coat of dielectric material. In order to obtain the appropriate capacitance values, the sequence is repeated as many times as is necessary to build up the required number of dielectric layers. The platen is then taken from the machine through a series of cutters which dice the material into the shape resulting in the layered monolithic structure in which the dielectric is about 2.5 mils. The monolithic ceramic capacitor is then fired in a kiln using conventional ceramic firing procedures. It is found however, that the monolithic ceramic capacitor so fired is characterized by the presence of air voids therein which lowers its density and results in a shorter dielectric life when subjected to a voltage stress.

An object of this invention is to eliminate the voids in a monolithic ceramic capacitor thereby increasing the density of the capacitor and improving its quality, reliability, and electrical properties as for example, increasing its dielectric life when subjected to a voltage stress.

It has now been found that the aforementioned objective can be obtained by treating the monolithic ceramic capacitor in the following manner. The monolithic ceramic capacitor is first heat treated at a temperature between 500° F. and 2000° F. for about 2 hours. Then, the monolithic ceramic capacitor is embedded in a suitable parting agent such as alumina inside a platinum lined, stainless steel container. The stainless steel container is evacuated and then sealed. The container is then placed in a high pressure gas autoclave and subjected to an isostatic inert gas pressure of 10,000 pounds per square inch at 2000° F. for about one half hour. The autoclave is then cooled down and the monolithic ceramic capacitor removed from the container. The monolithic ceramic capacitor is found to be void free, has a high density, and substantially improved electrical reliability.

A particular monolithic ceramic capacitor that has been found to be quite amenable to the above described treatment contains barium titanate or modified barium titanate as the dielectric material with electrodes of platinum or palladium.

The stainless steel container into which the monolithic ceramic capacitor was loaded consisted of stainless steel tubing having a 0.540 inch inside diameter and a 0.020 inch wall thickness. End plugs for the container were machined of stainless steel. Of course, the stainless steel containers may be of various design and configurations depending upon the particular application.

The particular equipment used for the above described gas pressure compaction was of relatively simple design. It measured 9 inches inside diameter by 4 feet inside length and was of the cold wall design incorporating a resistance heater inside of the vessel. Ceramic fiber material is tightly packed around the heater to insulate it from the autoclave wall, which is internally cooled by means of a coolant liner. The vessel is sealed at both ends by heads employing a modified Bridgeman closure, which can be readily opened for loading and unloading of specimens. Electrical and thermocouple leads to the interior of the autoclave were designed so that they can be readily connected. The gas pressure for the vessel is supplied by helium or argon by means of an Andreas Hafer, five-stage piston compressor.

The foregoing description is to be considered as merely illustrative of the invention and not in limitations thereof.

What is claimed is:
1. A method of eliminating voids in monolithic ceramic capacitors wherein the dielectric is barium titanate, said method including the steps of
   (1) heat treating the monolithic ceramic capacitor at a temperature between 500° F. and 2000° F. for about 2 hours,
   (2) embedding the monolithic capacitor dielectric in alumina contained in a platinum lined, stanless steel container,
   (3) evacuating and then sealing the container, and
   (4) placing the container in a high pressure gas autoclave and subjecting the container to an isostatic inert gas pressure of 10,000 pounds per square inch at 2000° F. for about ½ hour.

References Cited

UNITED STATES PATENTS

| 3,279,917 | 10/1966 | Ballard et al. | 264—332 |
| 2,956,327 | 10/1960 | Borel et al. | 264—332 |
| 2,892,955 | 6/1959 | Gulton | 264—332 |

FOREIGN PATENTS

| 613,273 | 1/1961 | Canada. |
| 634,385 | 1/1962 | Canada. |

ROBERT F. WHITE, *Primary Examiner.*

J. H. SILBAUGH, *Assistant Examiner.*

U.S. Cl. X.R.

264—332; 29—25.42; 106—39